United States Patent
Kondo et al.

(10) Patent No.: US 11,404,989 B2
(45) Date of Patent: Aug. 2, 2022

(54) POWER SUPPLY SYSTEM FOR VEHICLE

(71) Applicants: HONDA MOTOR CO., LTD., Tokyo (JP); Hitachi Astemo, Ltd., Ibaraki (JP)

(72) Inventors: Yasuhiko Kondo, Saitama (JP); Yuta Nakamura, Tochigi (JP); Nobukatsu Yamaguchi, Tochigi (JP)

(73) Assignees: HONDA MOTOR CO., LTD., Tokyo (JP); HITACHI ASTEMO, LTD., Ibaraki (JP)

( * ) Notice: Subject to any disclaimer, the term of this patent is extended or adjusted under 35 U.S.C. 154(b) by 56 days.

(21) Appl. No.: 17/078,099

(22) Filed: Oct. 23, 2020

(65) Prior Publication Data

US 2021/0288604 A1  Sep. 16, 2021

(30) Foreign Application Priority Data

Oct. 21, 2019 (JP) .................. 2019-192031

(51) Int. Cl.
| | | |
|---|---|---|
| *H02P 27/06* | (2006.01) | |
| *B60L 50/40* | (2019.01) | |
| *H02M 7/537* | (2006.01) | |

(52) U.S. Cl.
CPC .............. *H02P 27/06* (2013.01); *B60L 50/40* (2019.02); *H02M 7/537* (2013.01); *B60L 2210/40* (2013.01); *B60L 2240/429* (2013.01)

(58) Field of Classification Search
CPC .......... H02P 27/06; H02P 3/22; H02M 7/537; H02M 1/322
See application file for complete search history.

(56) References Cited

U.S. PATENT DOCUMENTS

| | | | | |
|---|---|---|---|---|
| 2010/0200377 | A1* | 8/2010 | Arakawa ................. | B60L 50/51 903/907 |
| 2013/0015802 | A1* | 1/2013 | Hirose .................... | H02M 1/32 318/488 |
| 2013/0204477 | A1* | 8/2013 | Sakata .................... | B60L 3/003 701/22 |
| 2014/0091618 | A1* | 4/2014 | Jeong ...................... | B60L 3/00 307/10.1 |
| 2017/0212160 | A1* | 7/2017 | Fulton .................... | H02H 3/08 |
| 2017/0361712 | A1* | 12/2017 | Terao ..................... | B60K 6/445 |
| 2018/0236874 | A1* | 8/2018 | Tsukada ................. | B60L 7/22 |

FOREIGN PATENT DOCUMENTS

JP         2016111754 A      6/2016

* cited by examiner

*Primary Examiner* — Rina I Duda
(74) *Attorney, Agent, or Firm* — CKC & Partners Co., LLC

(57) ABSTRACT

A power supply system (1) includes: a drive motor (M) coupled to drive wheels (W); a first inverter (23) which converts DC electric power into three-phase AC electric power; a first current sensor (23I) which generates a current detection signal according to electrical current flowing in the first inverter (23), and a system ECU (8) which executes discharge control for discharging electrical charge of a second smoothing capacitor (C2) connected to the first inverter (23), in a case of a discharge start condition being established. The system ECU (8), in a case of the drive motor (M) rotating upon starting the discharge control, executes the discharge control, after executing three-phase short-circuit control to turn ON all switching elements of an upper arm or all switching elements of a lower arm of the three-phase arm of the first inverter (23), based on the current detection signal of the sensor (23I).

6 Claims, 8 Drawing Sheets

POWER SUPPLY SYSTEM FOR VEHICLE

This application is based on and claims the benefit of priority from Japanese Patent Application No. 2019-192031, filed on 21 Oct. 2019, the content of which is incorporated herein by reference.

BACKGROUND OF THE INVENTION

Field of the Invention

The present invention relates to a power supply system for a vehicle. In more detail, it relates to a power supply system for a vehicle which suppresses rotation of a rotary electrical machine and discharges the electrical charge of a capacitor, in the case of a discharge start condition being established.

Related Art

A hybrid automobile and an electric vehicle such as an electric car are equipped with a power supply source, and travel using the electric power supplied from this power supply system to drive the motor. The power supply system includes: a high-voltage battery; a DC/DC converter which converts the output voltage of this high-voltage battery; and an inverter which converts the DC output of the DC/DC converter to alternating current, and supplies to the motor. In addition, a plurality of high-capacity smoothing capacity is provided to a high-voltage circuit configured by this DC/DC converter, inverter, etc.

However, during travel of the vehicle, although it is necessary to store electrical charge in the above-mentioned plurality of smoothing capacitors in order to stabilize the DC power of the power supply system, in the case of the vehicle crashing, for example, it is desired for the electrical charge stored in these smoothing capacitors to rapidly discharge. Therefore, with many vehicles, discharge control for discharging the electrical charge stored in the smoothing capacitors to any load, and rapidly decreasing the voltage of the high-voltage circuit is executed at the time of collision.

In addition, with the vehicle shown in Patent Document 1, in the case of the motor rotating upon starting discharge control after collision of the vehicle, the discharge control is executed after suppressing generation of induced electrical power by the motor rotating, by executing freewheel stop control to stop rotation of the motor.

Patent Document 1: Japanese Unexamined Patent Application, Publication No. 2016-111754

SUMMARY OF THE INVENTION

However, although the existence/absence of rotation of the motor is determined based on a detection signal of a resolver, the computer and resolver executing the discharge control and freewheel stop control are often connected via a control harness provided outside of the motor housing accommodating the motor. For this reason, there are cases where the control harness is damaged during collision of the vehicle, and it is no longer possible to determine the existence/absence of rotation of the motor on the computer side, and discharge control cannot be started at the appropriate timing.

The present invention has an object of providing a power supply system of a vehicle which can end freewheel stop control of a motor at the appropriate timing after collision of a vehicle, and then start discharge control.

A power supply system (for example, the power supply system 1 described later) for a vehicle according to a first aspect of the present invention is a power supply system for a vehicle includes: a rotary electrical machine (for example, the drive motor M described later) connected to a drive wheel (For example, the drive wheel W described later) of the vehicle (for example, the vehicle V described later) via a shaft; an inverter (for example, the first inverter 23 described later) which converts direct current electric power of a storage device (for example, the high-voltage battery 21 described later) into three-phase alternating current electric power by a three-phase arm, and supplies to the rotary electrical machine; a capacitor (for example, the second smoothing capacitor C2 described later) connected to the inverter; a current sensor (for example, the first current sensor 23I described later) which generates a current detection signal according to electrical current flowing in the inverter; and a control device (for example, the system ECU 8 described later) which executes a discharge control that discharges electrical charge of the capacitor, in a case of a discharge start condition being established, in which the control device, in a case of the rotary electrical machine rotating upon starting the discharge control, executes the discharge control, after executing three-phase short-circuit control to turn ON all switching elements of an upper arm or all switching elements of a lower arm of the three-phase arm, based on the current detection signal.

According to a second aspect of the present invention, in this case, it is preferable for the inverter, the control device and the current sensor to be accommodated in the same case (for example, the case 72 described later).

According to the first aspect, if the vehicle in which the drive wheels and rotary electrical machine are coupled via a shaft crashes, there are cases where the rotary electrical machine continues to rotate due to inertia after the vehicle has stopped due to the shaft coming off from the rotary electrical machine. In this regard, in the case of the discharge start condition being established, and the rotary electrical machine rotating upon starting discharge control, the control device executes the three-phase short-circuit control to turn ON all of the switching elements of the upper arm or the lower arm of the three-phase arm of the inverter, and then executes discharge control to discharge the electrical charge of the capacitor. It is thereby possible to start discharge control after stopping rotation of rotary electrical machine and suppressing the generation of induced electrical power of the rotary electrical machine M. In addition, using the even of electrical current flowing in the inverter only in the case of the rotary electrical machine rotating at the time of execution of the aforementioned such three-phase short-circuit control, the control device executes the three-phase short-circuit control based on the current detection signal of the current sensor detecting the electrical current flowing in the inverter. Even in a case of a control harness connecting the control device and resolver breaking by the vehicle crashing, since it is thereby possible to execute three-phase short-circuit control while confirming the existence/absence of rotation of the rotary electrical machine, it is possible to end the three-phase short-circuit control at a timing at which the rotation of the rotary electrical machine is stopped, and start the discharge control.

In the second aspect of the present invention, the inverter, control device and currents sensor are accommodated in the same case. Since it is thereby possible to protect the devices required in order to execute the three-phase short-circuit control and discharge control with the same case, it is possible to appropriately execute three-phase short-circuit control and discharge control at the time of collision of the vehicle.

DETAILED DESCRIPTION OF THE INVENTION

Figure 1:
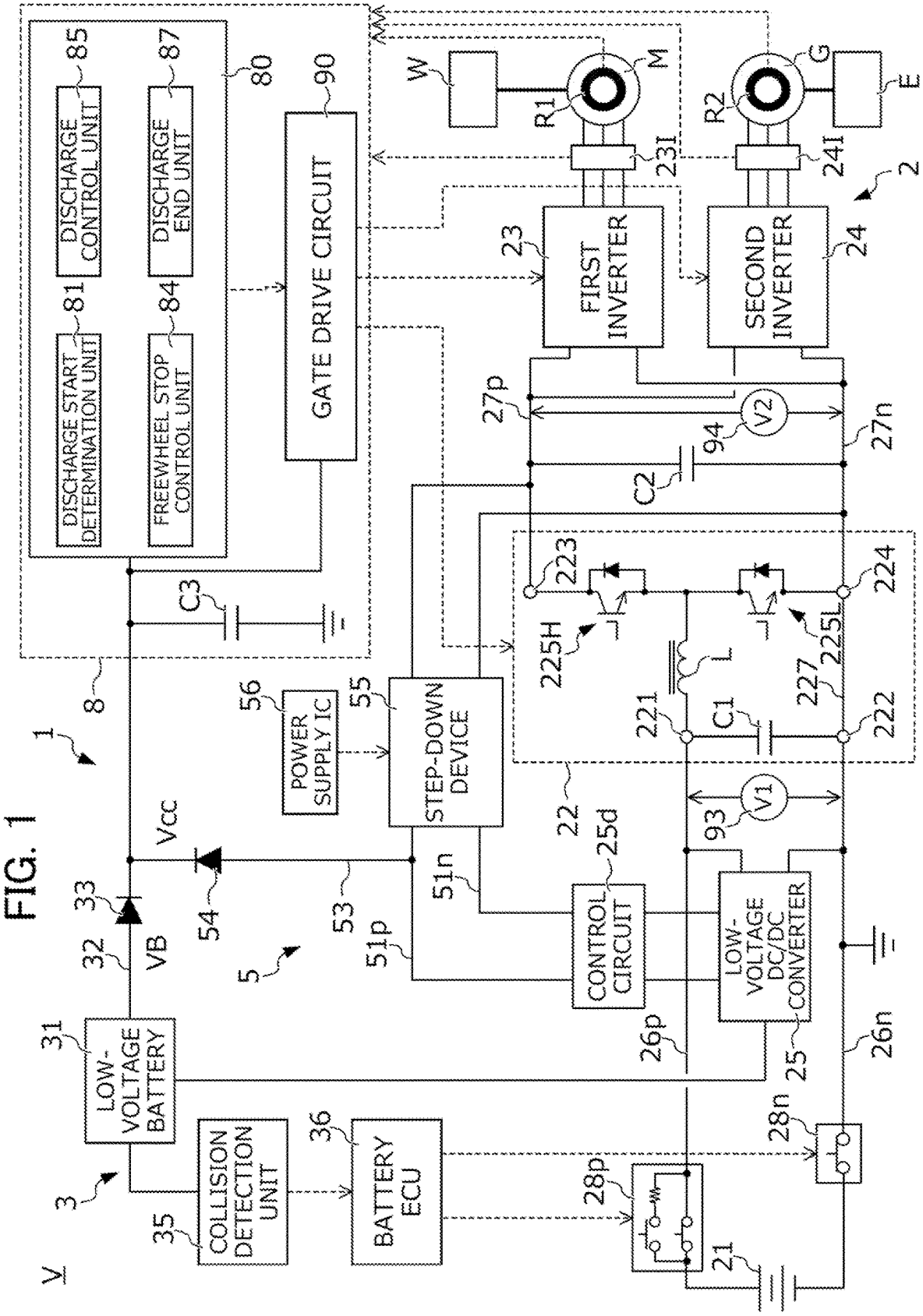
FIG. 1 is a view showing the configuration of a vehicle equipped with a power supply system according to an embodiment of the present invention.

Hereinafter, an embodiment of the present invention will be explained while referencing the drawings. FIG. 1 is a view showing the configuration of an electric vehicle (hereinafter referred to as simply "vehicle") equipped with a power supply system 1 according to the present embodiment. It should be noted that, in the present embodiment, an example with a so-called hybrid vehicle equipped with an engine E, drive motor M and generator G is explained as the vehicle V; however, the present invention is not limited thereto. The power supply system according to the present invention is not limited to a hybrid vehicle, and so long as being a vehicle which travels using the electric power stored in a battery such as an electric vehicle or fuel cell vehicle, it is possible to apply to any vehicle.

The vehicle V includes: a power supply system 1, an engine E, a drive motor M which is a rotary electric machine, a generator G, a drive wheel W, and a vehicle speed sensor (not illustrated). The drive motor M mainly generates motive power for the vehicle V to travel. The output shaft of the drive motor M is coupled to the drive wheels W via a drive shaft, transmission mechanism, etc. not illustrated. The torque generated by the drive motor M by supplying electric power to the drive motor M from the power supply system 1 is transferred to the drive wheels W via the drive shaft, transmission mechanism, etc. to cause the drive wheels W to rotate, whereby the vehicle V travels. In addition, the drive motor M acts as a generator upon decelerating regeneration of the vehicle V. The electric power generated by the drive motor M is charged to a high-voltage battery 21 described later which is equipped to the power supply system 1. The vehicle speed sensor generates a pulse signal according to the rotation speed of the drive wheels W, i.e. the vehicle speed, which is the speed of the vehicle V, and sends to the system ECU 8 described later.

In addition, a first resolver R1 for detecting the rotation angle of the output shaft is mounted to the drive motor M. The first resolver R1 energizes when the AC power from the system ECU 8 of the power supply system 1 is supplied, and sends a signal according to the rotation angle of the output shaft of the drive motor M via a control hardness 73 (refer to FIG. 3 described later) to the system ECU 8.

The crank shaft which is the output shaft of the engine E is coupled to the generator G via a transmission mechanism which is not illustrated. The generator G is driven by the motive power of the engine E to generate electric power. The electric power generated by the generator G is charged to the high-voltage battery 21. It should be noted that the engine E is coupled to the drive wheels W via the transmission mechanism which is not illustrated, and makes it possible to drive the drive wheels W using the motive force of the engine E.

In addition, a second resolver R2 for detecting the rotation angle of the output shaft is mounted to the output shaft of the generator G. The second resolver R2 energizes when AC power from the system ECU 8 of the power supply system 1 is supplied, and sends a signal according to the rotation angle of the output shaft of the generator G to the system ECU 8.

The power supply system 1 includes a high-voltage circuit 2 which connects the high-voltage battery 21, drive motor M and generator G, and performs transfer of electric power between the high-voltage battery 21, drive motor M and generator G; a low-voltage circuit 3 to which a low-voltage battery 31 is provided; a backup power supply unit 5; and the system ECU 8 which controls the drive motor M, generator G, high-voltage circuit 2, low-voltage circuit 3, backup power supply unit 5, etc.

The high-voltage circuit 2 includes: the high-voltage battery 21, the high-voltage DC/DC converter 22, the first power wires 26p, 26n connecting both positive and negative electrodes of the high-voltage battery 21, a low-voltage side positive electrode terminal 221 and low-voltage side negative electrode terminal 222 of the high-voltage DC/DC converter 22; a first inverter 23; a second inverter 24; second power wires 27p, 27n connecting the high-voltage side positive electrode terminal 223 and the high-voltage side negative electrode terminal 224 of the high-voltage DC/DC converter 22, and DC I/O side of each inverter 23, 24; a low-voltage DC/DC converter 25 connected to the first power wires 26p, 26n; a control circuit 25d thereof; and a second smoothing capacitor C2 connected to the second power wires 27p, 27n.

The high-voltage battery 21 is a secondary battery capable of both discharge which converts the chemical energy into electrical energy, and charge which converts electrical energy into chemical energy. Hereinafter, a case is explained of using a so-called lithium ion storage battery which performs charge/discharge by the lithium ions migrating between electrodes as this high-voltage battery 21; however, the present invention is not limited thereto.

A positive electrode contactor 28p and negative electrode contactor 28n are respectively provided to the first power wires 26p, 26n. These contactors 28p, 28n are normal open type which open in a state in which the command signal from outside is not being inputted, and break conductivity between both electrodes of the high-voltage battery 21 and the first power wires 26p, 26n, and close in a state in which the command signal is being inputted, and connect the high-voltage battery 21 and first power wires 26p, 26n. These contactors 28p, 28n open/close using the electric power supplied from the low-voltage battery 31, in response to the command signal sent from the battery ECU 36 described later. It should be noted that the positive electrode contactor 28p becomes a pre-charge contactor having a pre-charge resistance for mitigating rush current to the plurality of smoothing capacitors provided to the high-voltage circuit 2.

The high-voltage DC/DC converter 22 is provided between the first power wires 26*p*, 26*n* and second power wires 27*p*, 27*n*. The low-voltage side positive electrode terminal 221 and low-voltage side negative electrode terminal 222 of the high-voltage DC/DC converter 22 are connected to the high-voltage battery 21 via the first power wires 26*p*, 26*n* as described above, respectively. The high-voltage side positive electrode terminal 223 and high-voltage side negative electrode terminal 224 of the high-voltage DC/DC converter 22 are respectively connected to the first invert 23 and second inverter 24 via the second power wires 27*p*, 27*n* as described above, respectively.

The high-voltage DC/DC converter 22 is a two-way DC/DC converter which is configured by combining a reactor L, a first smoothing capacitor C1, a high-arm element 225H, a low-arm element 225L, and bus wires 227.

The bus wires 227 are wiring connecting the low-voltage side negative electrode terminal 222 and high-voltage negative electrode terminal 224. The first smoothing capacitor C1 has one end side thereof connected to the low-voltage side positive electrode terminal 221, and the other end side connected to the bus wire 227. The reactor L has one end side thereof connected to the low-voltage side positive electrode terminal 221, and the other end side thereof connected to a connection node between the high-arm element 225H and low-arm element 225L.

The high-arm element 225H includes: a well-known power switching element such as IGBT or MOSFET, and a diode connected in parallel to this power switching element. A low-arm element 225L includes: a well-known power switching element such as IGBT or MOSFET, and a diode connected in parallel to this power switching element. These high-arm element 225H and low-arm element 225L are connected in this order in series between the high-voltage side positive electrode terminal 223 and the bus wire 227.

The collector of the power switching element of the high-arm element 225H is connected to the high-voltage side positive electrode terminal 223, and the emitter thereof is connected to the collector of the low-arm element 225L. The emitter of the power switching element of the low-arm element 225L is connected to the bus wire 227. The forward direction of the diode provided to the high-arm element 225H is the direction from the reactor L towards the high-voltage side positive electrode terminal 223. In addition, the forward direction of the diode provided to the low-arm element 225L is the direction from the bus wire 227 towards the reactor L.

This high-arm element 225H and low-arm element 225L are respectively turned ON or OFF by the gate drive signal generated by a gate drive circuit 90 equipped to the system ECU 8.

The high-voltage DC/DC converter 22 exhibits a boosting function and step-down function by ON/OFF driving the above-mentioned elements 225H, 225L in accordance with the gate driving signal generated by at a predetermined timing from the gate drive circuit 90 of the system ECU 8. Boosting function refers to a function of outputting to the terminals 223, 224 on the high-voltage side by boosting the voltage applied to the terminals 221, 222 on the low-voltage side, whereby the electrical current is flowed from the first power wires 26*p*, 26*n* to the second power wires 27*p*, 27*n*. In addition, step-down function refers to a function of stepping down the voltage applied to the terminals 223, 224 on the high-voltage side and outputting to the terminals 221, 222 on the low-voltage side, whereby electrical current is flowed from the second power wires 27*p*, 27*n* to the first power wires 26*p*, 26*n*. It should be noted that the potential difference between the first power wires 26*p*, 26*n* refers to a primary-side voltage V1. In addition, the potential difference between the second power wires 27*p*, 27*n* refers to a secondary-side voltage V2.

Figure 2:
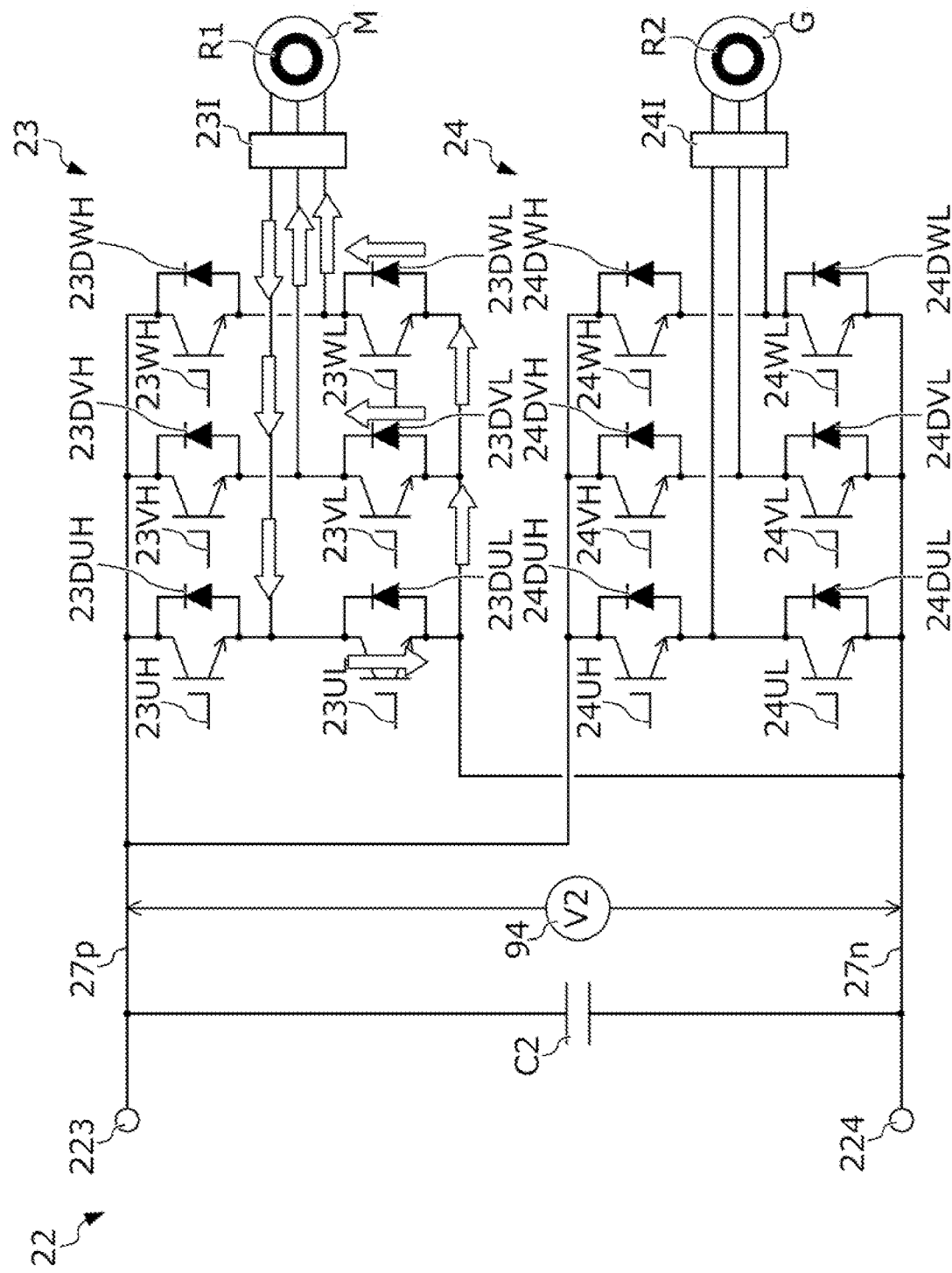
FIG. 2 is a view showing the configuration of a first inverter and second inverter.

FIG. 2 is a view showing the configurations of the first inverter 23 and second inverter 24. The first inverter 23 and second inverter 24, for example, are PWM inverters by pulse-width modulation equipped with bridge circuits configured by bridge connecting a plurality (six in the example of FIG. 2) of switching elements (for example, IGBT), and include functions of converting between DC power and AC power. The first inverter 23 is connected to the second power wires 27*p*, 27*n* at the DC I/O side thereof, and is connected to each coil of the U-phase, V-phase, W-phase of the drive motor M on the AC I/O side. The second inverter 24 is connected to the second power wires 27*p*, 27*n* at the DC I/O side thereof, and is connected to each coil of the U-phase, V-phase, W-phase of the drive motor M on the AC I/O side.

The first inverter 23 is configured by bridge connecting for every phase an upper U-phase switching element 23UH and a lower U-phase switching element 23UL connected to the U phase of the drive motor M; an upper V-phase switching element 23VH and lower V-phase switching element 23VL connected to the V phase of the drive motor M; and an upper W-phase switching element 23WH and lower W-phase switching element 23WL connected to the W phase of the drive motor M. In the first inverter 23, the upper arm is configured by three switching elements 23UH, 23VH, 23WH, and the lower arm is configured by the three switching elements 23UL, 23VL, 23WL. The three switching elements 23UH, 23VH, 23WH of the upper arm are respectively connected to the high-voltage side positive electrode 223 of the high-voltage DC/DC converter 22. In addition, the three switching elements 23UL, 23VL, 23WL of the lower arm are respectively connected to the high-voltage side negative electrode 224 of the high-voltage DC/DC converter 22. Between the collector-emitter of each switching element 23UH, 23UL, 23VH, 23VL, 23WH, 23WL, there are 23DUH, 23DUL, 23DVH, 23DVL, 23DWH, 23DWL connected so as to be the forward direction from the emitter to the collector. In addition, a chip temperature sensor (not illustrated) which detects the temperature of each switching element and sends a signal according to the detected value to the system ECU 8 is provided to the first inverter 23.

By ON/OFF driving the switching elements of the three-phase arm in accordance with the gate drive signals generated at the predetermined timing from the gate drive circuit 90 of the system ECU 8, the first inverter 23 converts the DC power supplied from the high-voltage DCDC converter 22 into three-phase AC power and supplies to the drive motor M, and converts three-phase AC power supplied from the drive motor M into DC power and supplies to the high-voltage DCDC converter 22.

The second inverter 24 is configured by bridge connecting for every phase an upper U-phase switching element 24UH and a lower U-phase switching element 24UL connected to the U phase of the generator G; an upper V-phase switching element 24VH and lower V-phase switching element 24VL connected to the V phase of the generator G; and an upper W-phase switching element 24WH and lower W-phase switching element 24WL connected to the W phase of the generator G. In the second inverter 24, the upper arm is configured by three switching elements 24UH, 24VH, 24WH, and the lower arm is configured by the three switching elements 24UL, 24VL, 24WL. The three switching elements 24UH, 24VH, 24WH of the upper arm are respectively connected to the high-voltage side positive electrode 223 of the high-voltage DC/DC converter 22. In addition, the three switching elements 24UL, 24VL, 24WL of the lower arm are respectively connected to the high-voltage side negative electrode 224 of the high-voltage DC/DC converter 22. Between the collector-emitter of each switching element 24UH, 24UL, 24VH, 24VL, 24WH, 24WL, there are 24DUH, 24DUL, 24DVH, 24DVL, 24DWH, 24DWL connected so as to be the forward direction from the emitter to the collector. In addition, a chip temperature sensor (not illustrated) which detects the temperature of each switching element and sends a signal according to the detected value to the system ECU 8 is provided to the second inverter 24.

By ON/OFF driving the switching elements of the three-phase arm in accordance with the gate drive signals generated at the predetermined timing from the gate drive circuit 90 of the system ECU 8, the second inverter 24 converts the DC power supplied from the high-voltage DCDC converter 22 into three-phase AC power and supplies to the generator G, and converts three-phase AC power supplied from the generator G into DC power and supplies to the high-voltage DCDC converter 22.

In addition, a first current sensor 23I and second current sensor 24I which send current detection signals according to the electrical current flowing in each phase to the system ECU 8 are provided to the first inverter 23 and second inverter 24. With the system ECU 8, it is possible to indirectly grasp the rotation angle, existence/absence of rotation, etc. of the output shafts of the drive motor M and generator G, by using the current detection signal sent from the current sensors 23I, 24I. For this reason, with the system ECU 8, even in the case of not being able to use the output signals of the resolvers R1, R2 due to failure, disconnect or the like, it is possible to continue control of the inverters 23, 24 using the current detection signal sent from these current sensors 23I, 24I.

Referring back to FIG. 1, the low-voltage DC/DC converter 25 is connected in parallel with the high-voltage DC/DC converter 22 to the first power wires 26p, 26n. The control circuit 25d steps down the voltage V1 between the first power wires 26p, 26n by ON/OFF driving the switching of the low-voltage DC/DC converter 25 using the electric power supplied from the backup power supply unit 5, then supplies to the low-voltage battery 31 and charges the low-voltage battery 31.

The low-voltage circuit 3 includes the low-voltage battery 31, first system control power wire 32, first diode 33, collision detection unit 35 and battery ECU 36.

The low-voltage battery 31 is a secondary battery capable of both discharge which converts the chemical energy into electrical energy, and charge which converts electrical energy into chemical energy. In the present embodiment, a case of using a lead battery made using lead in the electrodes as the low-voltage battery 31 is explained; however, the present invention is not to be limited thereto. In addition, hereinafter, a case in which the output voltage is lower than the output voltage of the high-voltage battery 21 as the low-voltage battery 31 will be explained. It should be noted that, hereinafter, a case of providing this low-voltage battery 31 to the vehicle front side of the engine room (not illustrated) of the vehicle V will be explained in consideration of the maintenance property by a worker; however, the present invention is not to be limited thereto.

The first system control power wire 32 is a feed wire which connects the low-voltage battery 31 and the system ECU 8, and supplies electric power from the low-voltage battery 31 to the system ECU 8. It should be noted that, hereinafter, the voltage of the first system control power wire 32, i.e. output voltage of the low-voltage battery 31, is noted as VB.

The first diode 33 is provided to the first system control power wire 32. The forward direction of the first diode 33 is the direction from the low-voltage battery 31 towards the system ECU 8, and permits electrical current from the low-voltage battery 31 to the system ECU 8.

The collision detection unit 35 determines whether the vehicle V has crashed or turned sideways by using the detection signal of an acceleration sensor (not illustrated), and in the case of having crashed or turned sideways, sends a collision detection signal to a battery ECU 36. The collision detection unit 35 functions using the electric power supplied from the low-voltage battery 31.

The battery ECU 36 is a microcomputer which performs control related to ON/OFF of the contactors 28p, 28n, monitoring of the state of the high-voltage battery 21 and low-voltage battery 31, etc. The battery ECU 36 functions using the electric power supplied from the low-voltage battery 31.

The battery ECU 36 includes a battery sensor unit which is not illustrated. This battery sensor unit is configured by a plurality of sensors required for estimating the internal state of the high-voltage battery 21 such as the voltage, electrical current and temperature of the high-voltage battery 21. The battery ECU 36 estimates the internal state (e.g., battery temperature, charge state, etc.) of the high-voltage battery 21 using the detection signal by this battery sensor unit.

The battery ECU 36, when the start switch is turned ON by the driver, activates under the electric power supplied from the low-voltage battery 31, and starts the pre-charge of the plurality of smoothing capacitors C1 and C2 provided to the high-voltage circuit 2. More specifically, the battery ECU 36 turns ON the contactors 28p, 28n, and performs pre-charge of the smoothing capacitors C1 and C2 by connecting the high-voltage battery 21 to the first power wires 26p, 26n. It should be noted that the battery ECU 36, upon performing pre-charge of the smoothing capacitors C1 and C2, turns ON the negative electrode contactor 28n, and turns ON the contactor having pre-charge resistance among the positive electrode contactors 28p. In addition, the battery ECU 36, after the pre-charge of the smoothing capacitors C1 and C2 completes, turns ON the contactor not having pre-charge resistance among the positive electrode contactors 28p. It is thereby possible to mitigate rush current to the smoothing capacitors C1 and C2 during execution of pre-charge.

After turning ON the contactors 28p, 28n by configuring in the above way, in the case of the start switch being turned OFF in order to stop the power supply system 1 by the driver, or in the case of receiving a collision detection signal from the collision detection unit 35, the battery ECU 36 turns OFF the contactors 28p, 28n, and detaches the high-voltage battery 21 from the first power wires 26p, 26n.

In addition, this battery ECU 36 makes it possible to perform CAN communication via the system ECU 8 and CAN bus (not illustrated). Therefore, the battery ECU 36 sends information related to the internal state of the high-voltage battery 21 estimated using the battery sensor unit to the system ECU 8 via CAN communication. In addition, while perform pre-charge of the smoothing capacitors C1 and C2 by the above such sequence, the battery ECU 36 sends a signal indicating this to the system ECU 8 via CAN communication so that the pre-charge in execution is not inhibited. In addition, the battery ECU 36, in the case of receiving a collision detection signal from the collision detection unit 35, turns OFF the contactors 28p, 28n in the above way, and sends a discharge enabling signal to the system ECU 8 via CAN communication. The discharge enabling signal is a signal permitting execution of rapid discharge processing (refer to FIGS. 4A and 4B) described later.

The backup power supply unit 5 includes third power wires 51p, 51n, a second system control power wire 53, a second diode 54, a step-down device 55 and a power supply IC 56.

The third power wires 51p, 51n are feed wires which connect the second power wires 27p, 27n of the high-voltage circuit 2 with the control circuit 25d of the low-voltage DC/DC converter 25, and supply electric power from the second power wires 27p, 27n to the control circuit 25d.

The step-down device 55 is provided to the third power wires 51p, 51n. The step-down device 55 is an insulation-type DC/DC converter including a transistor having a primary side connected to a side of the second power wire 27p, and having a secondary side thereof connected to a side of the control circuit 25d, and a switching element which intermits electric current flowing to the primary side of this transistor. The power supply IC 56, after the start switch is turned ON, and the contactors 28p, 28n are turned ON in the aforementioned way, steps down the electric power supplied from the second power wire 27p and outputs to the side of the control circuit 25d, by ON/OFF driving the switching elements of the step-down device 55 using the electric power supplied from the first power wire 26p (or second power wire 27p).

The second system control power wire 53 is a feed wire which connects between the control circuit 25d and step-down device 55 in the third power wire 51p, and more to a side of the system ECU 8 than the first diode 33 in the first system control power wire 32, and supplies electric power from the step-down device 55 to the system ECU 8. It should be noted that, hereinafter, the voltage of the second system control power wire 53, i.e. output voltage of the step-down device 55, is noted as Vcc. It should be noted that, hereinafter, a case of connecting, the second system control power wire 53 to the first system control power wire 32 is explained; however, the present invention is not to be limited thereto. The second system control power wire 53 may be directly connected to the system ECU 8 without going through the first system control power wire 32.

The second diode 54 is provided to the second system control power wire 53. The forward direction of the second diode 54 is the direction from the step-down device 55 towards the system ECU 8, and permits electrical current from the step-down device 55 to the system ECU 8.

Herein, setting of the output voltage Vcc of the step-down device 55 will be explained. As shown in FIG. 1, the low-voltage battery 31 which is the power supply source and the step-down device 55 are connected via the diodes 33, 54, respectively, to the system ECU 8 performing travel control of the vehicle V. For this reason, it becomes possible to selectively supply electric power from the one which is higher potential among these two power supply sources to the system ECU 8. In the present embodiment, the low-voltage battery 31 is defined as the main power supply of the system ECU 8, and since it is configured so as to use the step-down device 55 as a backup power source of the system ECU 8 in the case of a failure occurring in the low-voltage battery 31 (more specifically, case of the connection between the low-voltage battery 31 and system ECU 8 being lost by the vehicle V crashing, or case of entering a state in which the low-voltage battery 31 is not normal), and the supply of electric power from the low-voltage battery 31 to the system ECU 8 no longer being possible, the output voltage Vcc of the step-down device 55 is set so as to be within the operating voltage range of the system ECU 8, and lower than the output voltage VB in a state in which the low-voltage battery 31 is normal. Herein, the state in which the low-voltage battery 31 is not normal refers to a state in which the output voltage thereof dropped greater than when new, due to the deterioration of the low-voltage battery 31 advancing excessively, for example.

The system ECU 8 includes: a main microcomputer 80 which is a microcomputer; a gate drive circuit 90 which ON/OFF drives the switching elements of the high-voltage DC/DC converter 22, first inverter 23 and second inverter 24 in response to the command signal sent from this main microcomputer 80; a primary-side voltage sensor 93 and second-side voltage sensor 94 which detect the voltage of the high-voltage circuit 2; and a backup capacitor C3.

The main microcomputer 80, gate driver circuit 90, voltage sensors 93, 94 and backup capacitor C3 constituting the system ECU 8 function using the electric power supplied from the low-voltage battery 31 or backup power supply unit 5. The system ECU 8, when the start switch (not illustrated) is turned ON in order to startup the power supply system 1 by the driver, activates under the electric power supplied from the low-voltage battery 31, and subsequently operates using the electric power supplied from the low-voltage battery 31 or backup power supply unit 5.

The primary-side voltage sensor 93 detects the primary side voltage V1, which is the potential difference between the first power wires 26p, 26n, and sends a signal according to the detection value to the main microcomputer 80. The secondary side voltage sensor 94 detects the secondary side voltage V2, which is the potential difference between the second power wires 27p, 27n, and sends a signal according to the detected value to the main microcomputer 80.

The backup capacitor C3 is connected between the first diode 33 and main microcomputer 80 in the first system control power wire 32, for example. For this reason, while the low-voltage battery 31 is functioning as the main power supply relative to the system ECU 8, the backup capacitor C3 becomes always fully charged by the electric power supplied from the low-voltage battery 31. In addition, in the case of the supply of electric power from the low-voltage battery 31 to the system ECU 8 not being possible as mentioned above, the electric power stored in this backup capacitor C3 is appropriately consumed by the main microcomputer 80 and gate drive circuit 90. Therefore, this backup capacitor C3 functions as the aforementioned backup power supply unit 5 and backup power source of the system ECU 8.

In the present embodiment, a case of connecting the backup capacitor C3 between the first diode 33 and main microcomputer 80 in the first system control power wire 32 is explained; however, the present invention is not to be limited thereto. The backup capacitor C3 may connect to a side of the step-down device 55 from the second diode 54 in the second system control power wire 53, or between the step-down device 55 and control circuit 25d in the third power wire 51p. In this case, it is possible to always fully charge the backup capacitor C3 by the electric power supplied from the step-down device 55. By connecting the backup capacitor C3 at such a position, it is possible to supply electric power stored in the backup capacitor C3 further to the control circuit 25d, in addition to the main microcomputer 80 and gate drive circuit 90.

The main microcomputer 80 is a microcomputer which collectively performs travel control of the vehicle V, i.e. control of various devices constituting the high-voltage circuit 2, the drive motor M, generator G, etc. FIG. 1 illustrates only modules related to execution of discharge processing shown in FIGS. 4A and 4B described later, among the modules realized by the main microcomputer 80. Herein, discharge processing refers to a series of processing of determining whether any abnormality such as collision is not arising, and in the case of determining that abnormality has arisen, discharging the electric charge stored in the smoothing capacitor C2 of the high-voltage circuit 2 which becomes high voltage.

A discharge start determination unit 81 related to execution of the discharge start determination processing described later (refer to Step S2); a freewheel stop control unit 84 related to execution of the freewheel stop control processing described later (refer to Step S6); a discharge control unit 85 related to execution of the discharge control processing described later (refer to Step S9); and a discharge end unit 87 related to execution of the discharge end processing described later (refer to Step S11) are configured as modules related to the execution of discharge processing of FIGS. 4A and 4B described later in the main microcomputer 80.

Figure 3:
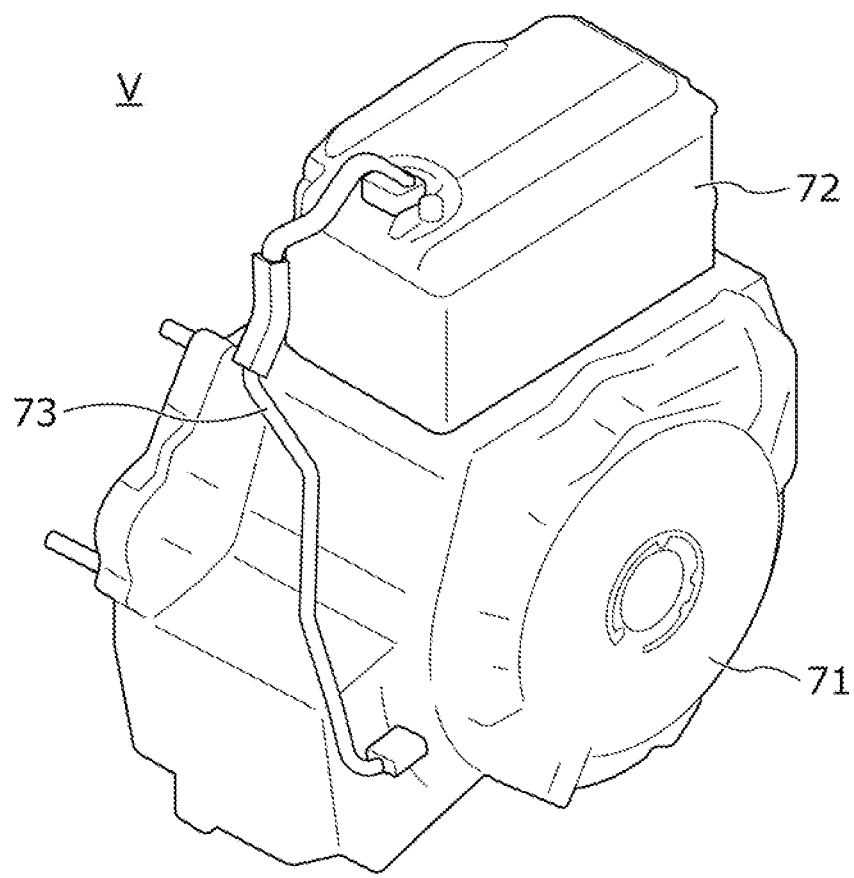
FIG. 3 is a perspective view of a motor housing equipped to the vehicle.

FIG. 3 is a perspective view of the motor housing 71 equipped to the vehicle V. The motor housing 71 is columnar, and the drive motor M and first resolver R1 are accommodated inside thereof. In addition, a box-like case 72 which accommodates the various devices required in order to control the drive motor M is provided to the upper part of the motor housing 71.

For example, the high-voltage DC/DC converter 22, first inverter 23, second inverter 24, first current sensor 23I, second current sensor 24I, first smoothing capacitor C1, second smoothing capacitor C2, backup power supply unit 5 and system ECU 8 are accommodated inside of the case 72. In addition, the first resolver R1 and system ECU 8 provided within the motor housing 71 are connected via the control harness 73 provided outside of the motor housing 71 and case 72.

The motor housing 71 and case 72 such as those shown in FIG. 3 are equipped within the engine room on the vehicle front side. For this reason, during collision of the vehicle V, the control harness 73 tends to be damaged more than the various devices accommodated within the motor housing 71 and case 72.

Figure 4A:
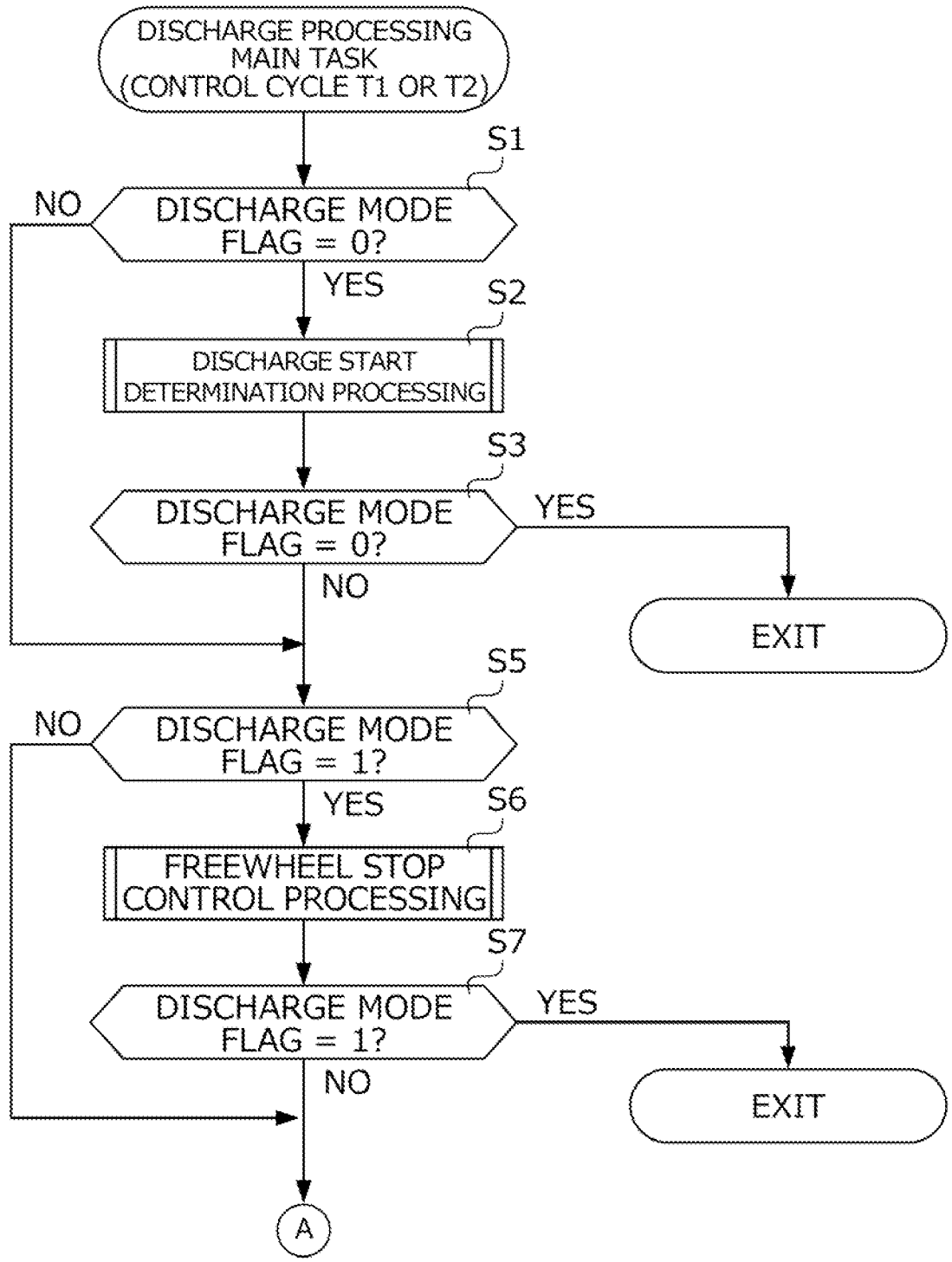
FIG. 4A is a flowchart showing a specific sequence of the main task of discharge processing (1 of 2)
Figure 4B:
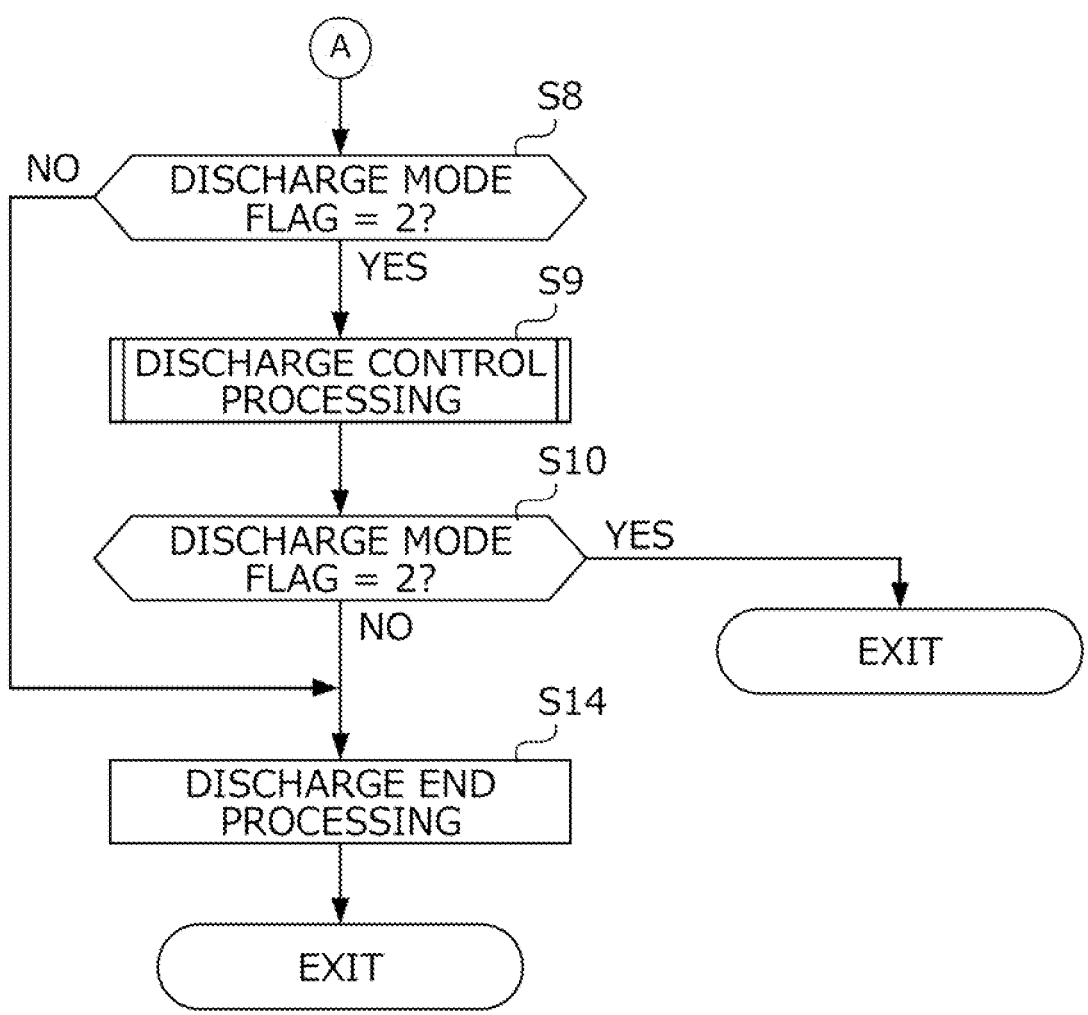
FIG. 4B is a flowchart showing a specific sequence of the main task of discharge processing (2 of 2)

FIGS. 4A and 4B are flowcharts showing the specific sequence of the main task of discharge processing in the system ECU 8. The discharge processing shown in FIGS. 4A and 4B is repeatedly executed in the system ECU 8 under the predetermined control cycle, while the vehicle V is activated.

Hereinafter, before explaining in detail the specific sequence of the flowchart, the discharge mode flag defined in the system ECU 8 and the contents indicated by the value thereof will be explained.

The discharge mode flag can assume any value among 0, 1, 2, 3. The discharge mode flag is a flag indicating the progress stage of the main task. The value of the discharge mode flag being "0" indicates that the discharge start condition described later is not established. The value of the discharge mode flag being "1" indicates being after the discharge start condition was established, and being during execution of the freewheel stop control processing described later. The value of the discharge mode flag being "2" indicates being after the discharge start condition was established, and being during execution of the discharge control processing described later. The value of the discharge mode flag being "3" indicates being after the discharge start condition was established, and being a state in which the secondary-side voltage sufficiently dropped by the discharge control processing being executed.

Returning to the main task in FIG. 4A, first in Step S1, the discharge start determination unit 81 of the system ECU 8 determines whether the discharge mode flag is "0". In the case of the determination result of Step S1 being NO, i.e. case of being determined that the discharge start condition (refer to Step S21 in FIG. 5) was established already in the control cycle before the previous time, the discharge start determination unit 81 advances to Step S5. In addition, in the case of the determination result of Step S1 being YES, i.e. in the case of the discharge start condition not being established yet, the discharge start determination unit 81 advances to Step S2, and after executing the discharge start determination processing (refer to FIG. 5), advances to Step S3. As described in detail later referencing FIG. 5, this discharge start determination processing determines whether a predetermined discharge start condition was established, and sets the value of the discharge mode flag to "0" or "1" according to this determination result.

Figure 5:
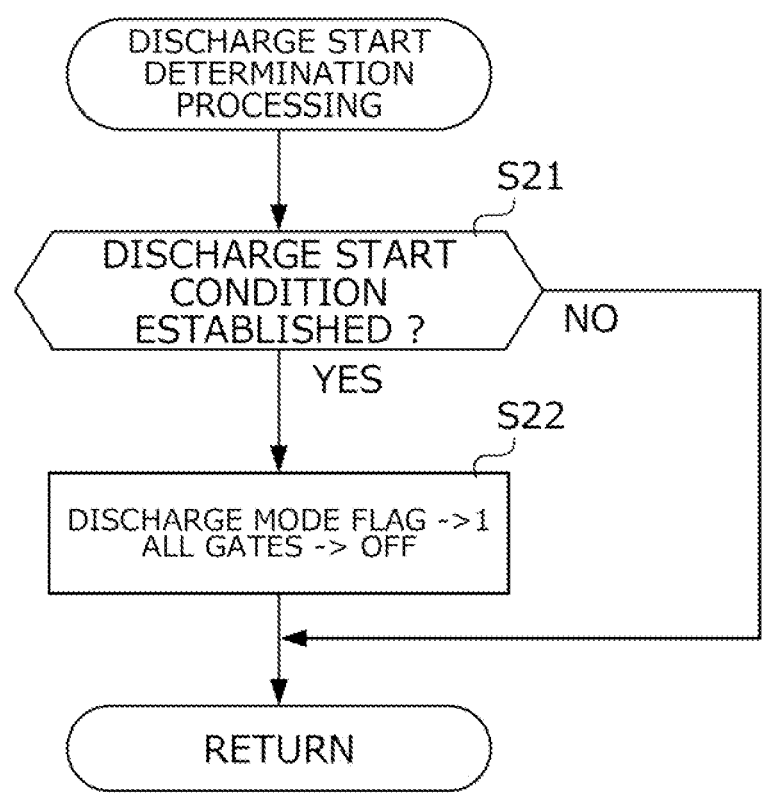
FIG. 5 is a flowchart showing a specific sequence of discharge start determination processing.

FIG. 5 is a flowchart showing a specific sequence of discharge start determination processing. First, in Step S21, the discharge start determination unit 81 determines whether the discharge start condition was established. This discharge start condition is configured by a condition which can be established in the case of the vehicle crashing, such as the system ECU 8 receiving a discharge enabling signal from the battery ECU 36 via CAN communication. In the case of the determination result of Step S21 being NO, i.e. case of the discharge start condition not being established, the discharge start determination unit 81 ends the discharge start determination processing in FIG. 5, and advances to Step S3 in FIG. 4A. In addition, in the case of the determination result of Step S21 being YES, i.e. case of the discharge start condition being established, the discharge start determination unit 81 advances to Step S22.

In Step S22, the discharge start determination unit 81 sets the value of the discharge mode flag from "0" to "1", turns OFF the gate of all switching elements of the first inverter 23, second inverter 24 and high-voltage DC/DC converter 22, ends the discharge start determination processing in FIG. 5, and advances to Step S3 in FIG. 4A.

Referring back to FIG. 4A, in Step S3, the discharge start determination unit 81 determines whether the value of the discharge mode flag is "0". In the case of the determination result of Step S3 being YES, i.e. case of the discharge start condition not being established, the discharge start determination unit 81 ends the main task of FIGS. 4A and 4B. In addition, in the case of the determination result of Step S3 being NO, i.e. case of being after the above-mentioned discharge start condition was established, the discharge start determination unit 81 advances to Step S5, and rapid discharge processing constituted by Steps S5 to S11 is started.

As shown in FIGS. 4A and 4B, the rapid discharge processing is divided into freewheel stop control processing (Step S6), discharge control processing (Step S9) and discharge end processing (Step S11).

First, in Step S5, the freewheel stop control unit 84 of the system ECU 8 determines whether the value of the discharge mode flag is "1". In the case of the determination result of Step S5 being YES, the freewheel stop control unit 84 advances to Step S6, and after executing the freewheel stop control processing, advances to Step S7. This freewheel stop control processing is processing which executes the freewheel stop control for decelerating or stopping rotation of the drive motor M while suppressing a rise in secondary side voltage, as explained by referencing FIG. 6 later. In addition, in the case of the determination result of Step S5 being NO, i.e. case of being after freewheel stop control completed, the freewheel stop control unit 84 advances to Step S8 without executing the freewheel stop control processing of Step S6.

In addition, in Step S7, the freewheel stop control unit 84 determines whether the value of the discharge mode flag is "1". In the case of the determination result of Step S7 being YES, i.e. case of being in execution of the freewheel stop control, the freewheel stop control unit 84 ends the main task of FIGS. 4A and 4B immediately, without performing the subsequent processing (Step S8 to S11). In the case of the determination result of Step S7 being YES, i.e. case of being after the freewheel stop control is completed, the freewheel stop control unit 84 advances to Step S8.

Next, in Step S8, the discharge control unit 85 of the system ECU 8 determines whether the value of the discharge mode flag is "2". In the case of the determination result of Step S8 being YES, the discharge control unit 85 advances to Step S9, and after executing the discharge control processing, advances to Step S10. This discharge control processing is processing which executes discharge control for discharging the electrical charge stored in the smoothing capacitors C1, C2, etc. of the high-voltage circuit 2, as explained by referencing FIG. 7 later. In addition, in the case of the determination result of Step S8 being NO, i.e. case of being after the discharge control processing is completed, the discharge control unit 85 advances to Step S11 without executing the discharge control processing of Step S9.

In addition, in Step S10, the discharge control unit 85 determines whether the value of the discharge mode flag is "2". In the case of the determination result of Step S10 being YES, i.e. case of being in execution of the discharge control processing, the discharge control unit 85 ends the main task of FIGS. 4A and 4B immediately without executing the subsequent processing. In the case of the determination result of Step S10 being YES, i.e. case of being after the discharge control processing is completed, the discharge control unit 85 advances to Step S11.

Next, in Step S11, a discharge end unit 87 of the system ECU 8 ends the main task of FIGS. 4A and 4B, after executing the discharge end processing. More specifically, the discharge end unit 87 activates the excitation output power source for exciting the first resolver R1 and second resolver R2, and in the case of activation being completed, resets the value of the discharge mode flag to "0".

Next, the specific contents of the freewheel stop control processing (Step S6) and discharge control processing (Step S9) constituting the rapid discharge processing will be explained in order.

Figure 6:
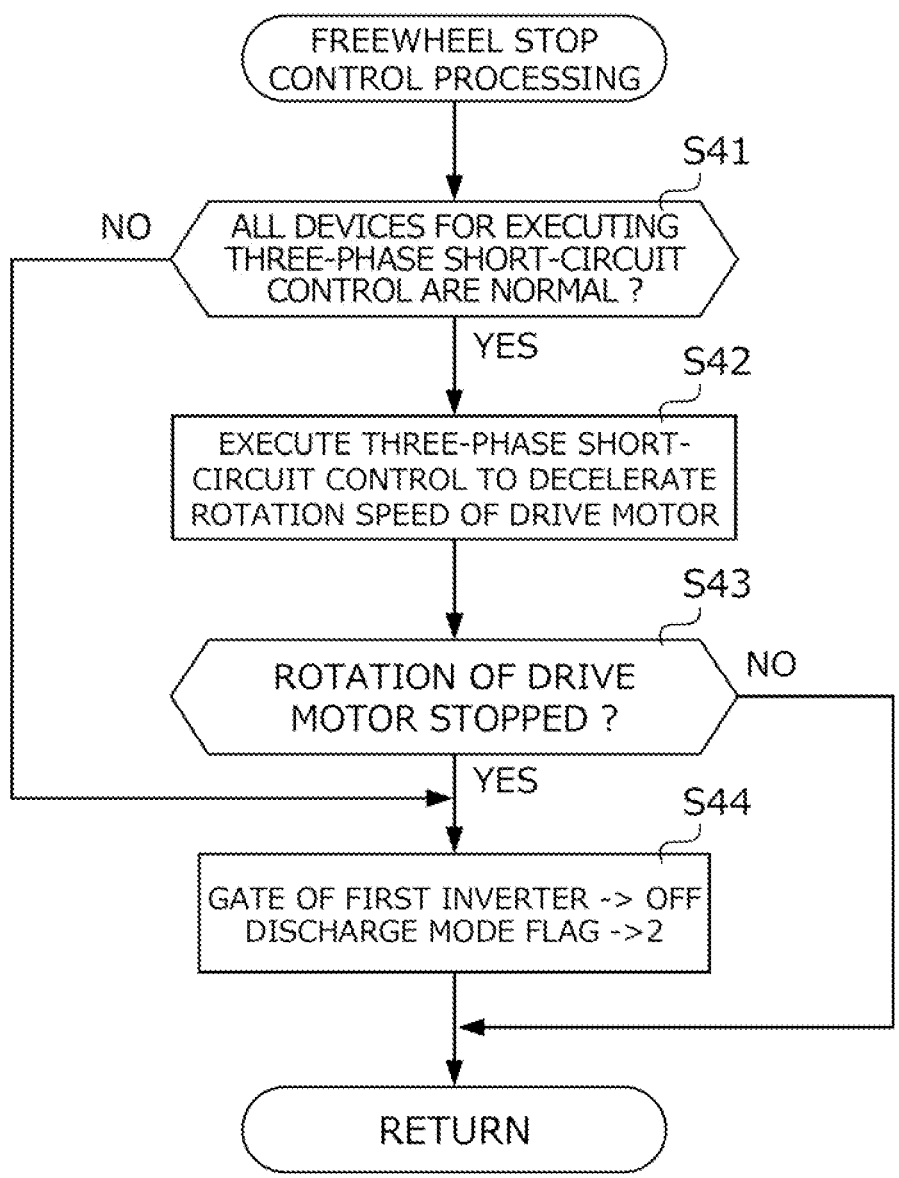
FIG. 6 is a flowchart showing a specific sequence of freewheel stop control processing in the main task of FIGS. 4A and 4B.

FIG. 6 is a flowchart showing a specific sequence of the freewheel stop control processing (Step S6) in the main task of FIGS. 4A and 4B. This freewheel stop control processing comes to be executed only in the case of the value of the discharge mode flag being "1", as shown in FIG. 4A. In this freewheel stop control processing, the freewheel stop control unit 84 decelerates or stops the rotation of the drive motor M while suppressing a rise in the secondary side voltage V2.

In Step S41, the freewheel stop control unit 84 determines whether the various devices (more specifically, first current sensor 23I, first inverter 23, etc.) required for executing the three-phase short-circuit control described later are all normal. The freewheel stop control unit 84 advances to Step S42, in the case of the determination result of Step S41 being YES, i.e. case of the above-mentioned various devices being normal. In addition, the freewheel stop control unit 84 advances to Step S44, in the case of the determination result of Step S41 being NO, i.e. case of any of the above-mentioned various devices failing.

In Step S42, the freewheel stop control unit 84 reduces the rotation speed of the drive motor M, by executing three-phase short-circuit control of the first inverter 23. More specifically, the freewheel stop control unit 84 executes upper arm three-phase short-circuit control for turning ON all of the switching elements 23UH, 23VH, 23WH of the upper arm of the first inverter 23, or lower arm three-phase short-circuit control for turning ON all of the switching elements 23UL, 23VL, 23WL of the lower arm, and then advances to Step S43. By executing such upper arm three-phase short-circuit control or lower arm three-phase short-circuit control, in the case of the drive motor M rotating, the brake torque decelerating the output shaft generates at the drive motor M, by the electrical current drifting between the switching elements, diodes and drive motor M, as shown by the bold arrow in FIG. 2 (FIG. 2 showing case of executing lower arm three-phase short-circuit control). For this reason, by continually executing this upper arm three-phase short-circuit control or lower arm three-phase short-circuit control, it is possible to more quickly decelerate the rotation speed of the drive motor M more than a case of decelerating by friction alone. It should be noted that, in Step 42, the freewheel stop control unit 84 may alternately execute every predetermined time the upper arm three-phase short-circuit control and lower arm three-phase short-circuit control in order to suppress overheating of each switching element and diode.

In Step S43, the freewheel stop control unit 84 determines whether rotation of the drive motor M has almost stopped based on the current detection signal sent from the first current sensor 23I. More specifically, the freewheel stop control unit 84 acquires the electrical current of each phase Iu, Uv, Iw based on the current detection signal sent from the first current sensor 23I, calculates the sum of squares $((Iu)^2+(Iv)^2+(Iw)^2)$ of three-phase current using these, and determines whether this sum of squares of three-phase current is no more than a threshold set to 0 or a value slightly greater than 0. When executing the upper arm three-phase short-circuit control or lower arm three-phase short-circuit control in a state in which the drive motor M is rotating as mentioned above, electrical current flows between the first inverter 23 and drive motor M. Therefore, the freewheel stop control unit 84 determines that the rotation of the drive motor M has not stopped in the case of the sum of squares of the three-phase electrical current calculated being greater than the threshold, and determines that the rotation of the drive motor M is almost stopped in the case of the sum of squares of three-phase electrical current being no more than the threshold.

In the case of the determination result of Step S43 being YES, i.e. case of rotation of the drive motor M almost stopped, and reaching the time to end freewheel stop control, the freewheel stop control unit 84 advances to Step S44. In Step S44, the freewheel stop control unit 84 turns OFF the gates of all switching elements of the first inverter 23, further changes the value of the discharge mode flag explicitly stating that freewheel stop control has ended from "1" to "2", and advances to Step S7 of the main task in FIGS. 4A and 4B.

In the case of the determination result of Step S43 being NO, i.e. case of rotation of the drive motor M not stopping, the freewheel stop control unit 84 advances to Step S7 of the main task in FIGS. 4A and 4B, while maintaining the value of the discharge mode flag at "1", to continue executing the three-phase short-circuit control.

Figure 7:
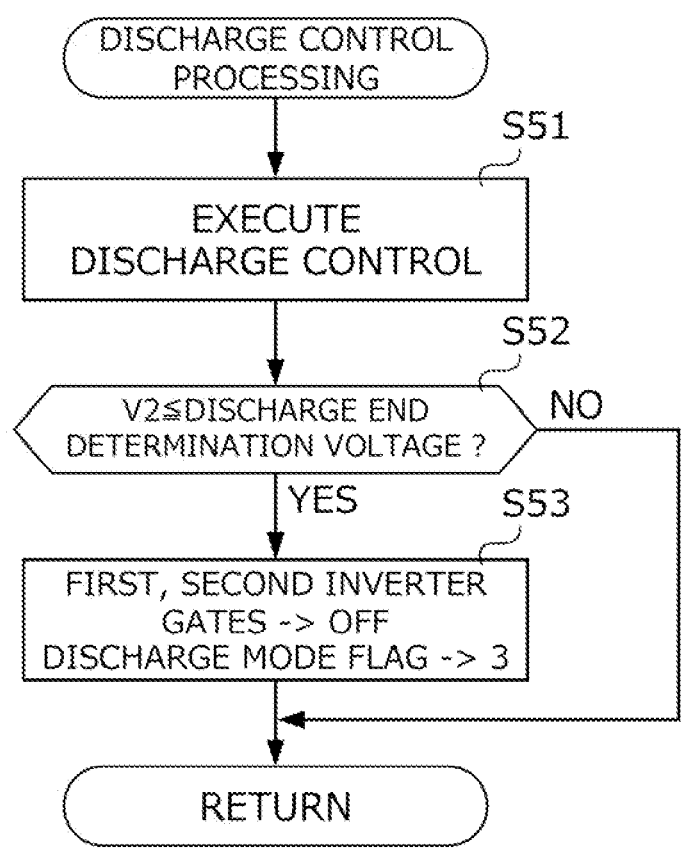
FIG. 7 is a flowchart showing a specific sequence of discharge control processing in the main task of FIGS. 4A and 4B.

FIG. 7 is a flowchart showing a specific sequence of the discharge control processing (Step S9) in the main task of FIGS. 4A and 4B. This discharge control processing comes to be executed only in the case of the value of the discharge mode flag being "2", as shown in FIG. 4B. In this discharge control processing, the discharge control unit 85 causes the secondary side voltage V2 to decline by discharging the electrical charge stored in the second smoothing capacitor C2 of the high-voltage circuit 2.

First, in Step S51, the discharge control unit 85 of the system ECU 8 executes discharge control. With this discharge control, the discharge control unit 85 executes a known control method (for example, method of discharging the electrical charge stored in the second smoothing capacitor C2 by switching control of the first inverter 23 and second inverter 24, method of discharging the electrical charge stored in the second smoothing capacitor C2 using a discharge resistor not illustrated, or the like) to cause the secondary side voltage to rapidly decline.

In Step S52, the discharge control unit 85 determines whether the secondary side voltage V2 acquired using the secondary side voltage sensor 94 is no more than the discharge end determination voltage set for the secondary side voltage in order to determine the end time of discharge control processing. In the case of the determination result of Step S52 being NO, i.e. case of determining that the secondary side voltage V2 has still not sufficiently dropped, the discharge control unit 85 advances to Step S10 in the main task of FIGS. 4A and 4B, while maintaining the value of the discharge mode flag at "2", in order to continue executing discharge control also in the next control cycle. In the case of the determination result of Step S52 being YES, the discharge control unit 85 advances to Step S53.

In Step S53, the discharge control unit 85 sets to "3" the value of the discharge mode flag to explicitly state that the discharge control processing ended, after turning OFF the gates of all switching elements of the first inverter 23 and second inverter 24, and then advances to Step S10 in the main task of FIGS. 4A and 4B.

According to the above such power supply system 1, the following effects are exerted.

(1) If the vehicle V in which the drive wheels W and drive motor M are coupled via a drive shaft crashes, there are cases where the drive motor M continues to rotate due to inertia after the vehicle V has stopped due to the drive shaft coming off from the drive motor M. In this regard, in the case of the discharge start condition being established, and the drive motor M rotating upon starting discharge control to discharge the electrical charge of the second smoothing capacitor C2, the system ECU 8 executes the three-phase short-circuit control to turn ON all of the switching elements of the upper arm of the three-phase arm of the first inverter 23, or turn ON all of the switching elements of the lower arm thereof, and then executes discharge control. It is thereby possible to start discharge control after stopping rotation of the drive motor M and suppressing the generation of induced electrical power of the drive motor M. In addition, using the event of electrical current flowing in the first inverter 23 only in the case of the drive motor M rotating during execution of the aforementioned such three-phase short-circuit control, the system ECU 8 executes the three-phase short-circuit control based on the current detection signal of the first current sensor 23I which detects the electrical current flowing in the first inverter 23. More specifically, the system ECU 8 executes the three-phase short-circuit control until the sum of squares of the three-phase current calculated based on the current detection signal of the first current sensor 23I becomes no more than a predetermined threshold. Even in a case of the control harness 73 connecting the system ECU 8 and first resolver R1 breaking by the vehicle V crashing, since it is thereby possible to execute three-phase short-circuit control while confirming the existence/absence of rotation of the drive motor M, it is possible to end the three-phase short-circuit control at a timing at which it is possible to determine that rotation of the drive motor M has almost stopped, and start the discharge control.

(2) In the power supply system 1, the first inverter 23, system ECU 8 and first current sensor 23I are accommodated in the same case 72. Since it is thereby possible to protect the devices required in order to execute the three-phase short-circuit control and discharge control with the same case 72, it is possible to appropriately execute three-phase short-circuit control and discharge control at the time of collision of the vehicle V.

Although an embodiment of the present invention has been explained above, the present invention is not limited thereto.

What is claimed is:

1. A power supply system for a vehicle comprising:
a rotary electrical machine connected to a drive wheel of the vehicle via a shaft;
an inverter which converts direct current electric power of a storage device into three-phase alternating current electric power by a three-phase arm, and supplies to the rotary electrical machine;
a first capacitor connected to the inverter;
a current sensor which generates a current detection signal according to electrical current flowing in the inverter;
a control device which executes a discharge control that discharges electrical charge of the first capacitor, in a case of a discharge start condition being established;
a backup power supply unit which steps down the electric power supplied from a power line to which the first capacitor is connected and supplies the electric power to the control device; and
a case which accommodates the inverter, the control device, the current sensor, the first capacitor, and the backup power supply unit,
wherein the control device, in a case of the rotary electrical machine rotating upon starting the discharge control, executes the discharge control, after executing three-phase short-circuit control to turn ON all switching elements of an upper arm or all switching elements of a lower arm of the three-phase arm, based on the current detection signal.

2. The power supply system for a vehicle according to claim further comprises a motor housing which houses the rotary electrical machine, wherein the case is located on top of the motor housing.

3. The power supply system for a vehicle according to claim 2, wherein the control device executes the three-phase short-circuit control untile the sum of squares of the three-phase currents obtained based on the current detection signal is below a threshold value.

4. The power supply system for a vehicle according to claim 2, wherein the case is located inside of a horizontal side end face of the motor housing.

5. The power supply system for a vehicle according to claim 4, further comprises a control harness which transmits a signal regarding the rotation angle of the rotary electrical machine to the control device, wherein the control harness is connected to a top of the case.

6. The power supply system for a vehicle according to claim 1, further comprises a voltage converter which boosts the voltage of the storage device and outputs the power to the power line, and a second capacitor connected to an input end of the voltage converter, wherein the case further accommodates the voltage converter, and the second capacitor.

* * * * *